(12) United States Patent
Rodrigo et al.

(10) Patent No.: US 11,778,469 B2
(45) Date of Patent: Oct. 3, 2023

(54) FIRST NODE, SECOND NODE, THIRD NODE, AND METHODS PERFORMED THEREBY FOR MANAGING DATA IN A DATABASE IN A COMMUNICATIONS NETWORK

(71) Applicant: Telefonaktiebolaget LM Ericsson (PUBL), Stockholm (SE)

(72) Inventors: Maria Cruz Bartolome Rodrigo, Madrid (ES); Victor Ferraro Esparza, Valencia (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 264 days.

(21) Appl. No.: 17/269,419

(22) PCT Filed: Oct. 11, 2018

(86) PCT No.: PCT/EP2018/077753
§ 371 (c)(1),
(2) Date: Feb. 18, 2021

(87) PCT Pub. No.: WO2020/038590
PCT Pub. Date: Feb. 27, 2020

(65) Prior Publication Data
US 2021/0258789 A1    Aug. 19, 2021

(30) Foreign Application Priority Data
Aug. 20, 2018 (EP) ..................................... 18382620

(51) Int. Cl.
*H04W 12/086* (2021.01)
*H04W 12/72* (2021.01)
(Continued)

(52) U.S. Cl.
CPC ........... *H04W 12/086* (2021.01); *H04W 8/18* (2013.01); *H04W 12/72* (2021.01); *H04W 48/18* (2013.01)

(58) Field of Classification Search
CPC ..... H04W 12/086; H04W 12/72; H04W 8/18; H04W 48/18
See application file for complete search history.

(56) References Cited

U.S. PATENT DOCUMENTS

2017/0171215 A1    6/2017  Brucker
2018/0192471 A1*   7/2018  Li .................... H04W 72/0493

FOREIGN PATENT DOCUMENTS

KR    10-2016-0004363 A    1/2016
WO    2018 077294 A1       5/2018

OTHER PUBLICATIONS

3GPP TS 23.335 v12.0.0; Technical Specification; 3rd Generation Partnership Project; Technical Specification Group Core Network and Terminals; User Data Convergence (UDC); Technical realization and information flows; Stage 2 (Release 12)—Sep. 2014.

(Continued)

*Primary Examiner* — Wayne H Cai
(74) *Attorney, Agent, or Firm* — BAKER BOTTS L.L.P.

(57) ABSTRACT

A method, performed by a first node (111), for managing data in a database (115) in a communications network (100) is described. The first node (111) operates in the communications network (100). The first node (111) receives (302) a request from a second node (112) operating in the communications network (100). The request is to modify an authorization to manage the data. The request is received as a service operation of a set of service operations provided by a service of the database (115). The first node (111) provides (303) a response to the second node (112) based on the received request, and further based on the authorization as defined by a third node (113) operating in the communica- (Continued)

tions network (100). The first node (111) is a service producer of the database (115), the second node (112) is a service consumer, and the third node (113) is an initial provisioner of the authorization.

26 Claims, 6 Drawing Sheets

(51) Int. Cl.
*H04W 8/18* (2009.01)
*H04W 48/18* (2009.01)

(56) References Cited

OTHER PUBLICATIONS

3GPP TS 23.501 v15.0.0; Technical Specification; 3rd Generation Partnership Project; Technical Specification Group Services and Systems Aspects; System Architecture for the 5G System; Stage 2 (Release 15)—Dec. 2017.
3GPP TS 23.502 v15.0.0; Technical Specification; 3rd Generation Partnership Project; Technical Specification Group Services and System Aspects: Procedures for the 5G System; Stage 2 (Release 15)—Dec. 2017.
PCT International Search Report issued for International application No. PCT/EP2018/077753—dated Apr. 11, 2019.
PCT Written Opinion of the International Searching Authority issued for International application No. PCT/EP2018/077753—dated Apr. 11, 2019.

* cited by examiner a)

b)

a)

b)

a)

b)

a)

b)

FIRST NODE, SECOND NODE, THIRD NODE, AND METHODS PERFORMED THEREBY FOR MANAGING DATA IN A DATABASE IN A COMMUNICATIONS NETWORK

PRIORITY

This nonprovisional application is a U.S. National Stage Filing under 35 U.S.C. § 371 of International Patent Application Serial No. PCT/EP2018/077753 filed Oct. 11, 2018 and entitled "First Node, Second Node, Third Node, and Methods Performed Thereby For Managing Data in a Database in a Communications Network" which claims priority to European Patent Application No. 18 382 620.5 filed Aug. 20, 2018 both of which are hereby incorporated by reference in their entirety.

TECHNICAL FIELD

The present disclosure relates generally to a first node and methods performed thereby for managing data in a database in a communications network. The present disclosure also relates generally to a second node, and methods performed thereby for managing data in a database in a communications network. The present disclosure further relates generally to a third node, and methods performed thereby for managing data in a database in a communications network.

BACKGROUND

Computer systems may comprise one or more nodes. A node may comprise one or more processors which, together with computer program code may perform different functions and actions, a memory, a receiving and a sending port. A node may be, for example, a server. Nodes may be comprised in a communications network.

Some types of nodes within a communications network may be wireless devices, e.g., stations (STAs), User Equipments (UEs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g. between two wireless devices, between a wireless device and a regular telephone, and/or between a wireless device and a server via a Radio Access Network (RAN), and possibly one or more core networks, comprised within the telecommunications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The communications network may cover a geographical area which may be divided into cell areas, each cell area being served by another type of node, a network node or Transmission Point (TP), for example, an access node such as a Base Station (BS), e.g. a Radio Base Station (RBS), which sometimes may be referred to as e.g., evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies.

In 3rd Generation Partnership Project (3GPP) Long Term Evolution (LTE), base stations, which may be referred to as eNodeBs or even eNBs, may be directly connected to one or more core networks. All data transmission in LTE is controlled by the radio base station.

The standardization organization 3GPP is currently in the process of specifying a New Radio Interface called NR or 5G-UTRA, as well as a Fifth Generation (5G) Packet Core Network, which may be referred to as Next Generation Core Network, abbreviated as NG-CN, NGC or 5G CN.

A 3GPP system comprising a 5G Access Network (AN), a 5G Core Network and a UE may be referred to as a 5G system. A new standard for the 5G System, Rel-15, has been just released, and is documented in [1] and [2].

5G includes a disruptive change, which is that traditional peer-to-peer interfaces and protocols are modified by a so-called Service Based Architecture (SBA), where each Network Function (NF) may provide one or multiple services, as a producer, to one or multiple consumers, by means of HTTP/REST, and e.g., not be limited to providing a service specifically to the peer in the peer-to-peer call flow. A service may be understood as a functionality that may provide operations for interaction with other functionalities, each of which may in turn provide themselves some operations for interaction with other functionalities. Examples of services may be: Nudm_SubscriberDataManagement, Namf_Communication, Nudr_DM, Nsmf_PDUSession, etc . . . .

A new 5G Unified Data Repository (UDR) may be defined to store not only subscription data, as in the former 4G User Data Repository (UDR). The new definition of 5G UDR may be found in clauses 6.2.11 and 4.2.5 in reference [1], as mainly summarized in FIG. 1. FIG. 1 is a schematic diagram depicting a UDR 10 comprising different data sets or subsets 12, such as Subscription data, Policy data, Structured data for exposure, and Application data. The UDR may serve different service consumers 15. A service consumer may be understood as a node that may require a functionality that may be provided by another node, which may therefore be understood as the provider. As shown in FIG. 1, a service consumer may be a Unified Data Management (UDM) Function, a Policy Control Function (PCF) and a Network Exposure Function (NEF). The 5G UDR is modelled in SBA, that is, it may offer services via a Nudr interface 17. A definition of Nudr services may be found in clause 5.2.11 in reference [2], as summarized below, in Table 1. The Nudr interface 17 may be defined for the network functions, such as UDM, PCF and NEF, to access a particular set of the data stored and to query, create, update, (including add, modify), delete, and subscribe to notification of relevant data changes in the UDR. Access to the data is provided by a Data Access provider 19, via the Nudr interface 17.

TABLE 1

Service provided by UDR, and operations

| NF service | Service Operations | Operation Semantics | Example Consumer(s) |
|---|---|---|---|
| Unified Data Management (UDM) | Query | Request/Response | UDM, PCF, NEF (PFDF) |
| | Create | Request/Response | NEF (PFDF) |
| | Delete | Request/Response | NEF (PFDF) |
| | Update | Request/Response | UDM, PCF, NEF (PFDF) |
| | Subscribe | Subscribe/Notify | UDM, PCF, NEF (PFDF) |
| | Unsubscribe | | UDM, PCF, NEF (PFDF) |
| | Notify | | UDM, PCF, NEF (PFDF) |

In clause 4.2.5 in reference [1] it is stated:

"Each NF service consumer accessing the UDR, via Nudr, shall be able to add, modify, update or delete only the data it is authorized to change. This authorization shall be performed by the UDR on a per data set and NF service consumer basis and potentially on a per UE, subscription granularity."

How this authorization is performed is not described any further in 3GPP.

SUMMARY

It is an object of embodiments herein to improve the management of data in a database in a communications network.

According to a first aspect of embodiments herein, the object is achieved by a method performed by a first node. The method is for managing data in a database in a communications network. The first node operates in the communications network. The first node receives a request from a second node operating in the communications network. The request is to modify an authorization to manage the data in the database. The request is received as a service operation of a set of service operations provided by a service of the database. The first node then provides a response to the second node.

The response is based on the received request. The response is further based on the authorization as defined by a third node operating in the communications network. The first node is a service producer of the database. The second node is a service consumer. The third node is an initial provisioner of the authorization.

According to a second aspect of embodiments herein, the object is achieved by a method, performed by the second node. The method is for managing data in the database in the communications network. The second node operates in the communications network. The second node sends the request to the first node operating in the communications network. The request is to modify the authorization to manage the data in the database. The request is sent as a service operation of the set of service operations provided by the service of the database. The second node then receives the response from the first node. The response is based on the sent request. The response is further based on the authorization as defined by the third node operating in the communications network. The first node is a service producer of the database. The second node is a service consumer. The third node is the initial provisioner of the authorization.

According to a third aspect of embodiments herein, the object is achieved by a method, performed by the third node. The method is for managing the data the database in the communications network. The third node operates in the communications network. The third node sends, to the first node operating in the communications network, an authorization for the second node operating in the communications network to manage the data in the database. The authorization is sent as a service operation of the set of service operations provided by the service of the database. The first node is the service producer of the database. The second node is the service consumer. The third node is the initial provisioner of the authorization.

According to a fourth aspect of embodiments herein, the object is achieved by the first node, configured to manage the data in the database in the communications network. The first node is configured to operate in the communications network. The first node is further configured to receive the request from the second node configured to operate in the communications network. The request is configured to modify the authorization to manage the data in the database. The request is configured to be received as a service operation of the set of service operations configured to be provided by a service of the database. The first node is further configured to provide the response to the second node. The response is configured to be based on the request configured to be received, and is further configured to be based on the authorization as defined by the third node configured to operate in the communications network. The first node is configured to be the service producer of the database. The second node is configured to be the service consumer. Third node is configured to be the initial provisioner of the authorization.

According to a fifth aspect of embodiments herein, the object is achieved by the second node, configured to manage the data in the database in the communications network. The second node is configured to operate in the communications network. The second node is further configured to send the request to the first node configured to operate in the communications network The request is configured to be to modify the authorization to manage the data in the database. The request is configured to be sent as a service operation of the set of service operations configured to be provided by a service of the database. The second node is further configured to receive the response from the first node. The response is configured to be based on the request configured to be sent. The response is further configured to be based on the authorization as configured to be defined by the third node configured to operate in the communications network. The first node is configured to be the service producer of the database. The second node is configured to be the service consumer. The third node is configured to be the initial provisioner of the authorization.

According to a sixth aspect of embodiments herein, the object is achieved by the third node configured to manage the data in the database in the communications network The third node is configured to operate in the communications network. The third node is further configured to send, to the first node configured to operate in the communications network, the authorization for the second node configured to operate in the communications network to manage the data in the database. The authorization is configured to be sent as a service operation of the set of service operations configured to be provided by a service of the database. The first node is configured to be the service producer of the database.

The second node is configured to be the service consumer. The third node is configured to be the initial provisioner of the authorization.

By the first node receiving the request from the second node as a service operation, and providing the response based on the authorization as defined by the third node, the second node, as each consumer of the database, is enabled to modify the access and authorization framework of the database in a standardized fashion, which simplifies the process of managing the authorization to the database, and eases the time and resources that may need to be dedicated to its creation and maintenance.

BRIEF DESCRIPTION OF THE DRAWINGS

Examples of embodiments herein are described in more detail with reference to the accompanying drawings, according to the following description.

DETAILED DESCRIPTION

As part of the development of embodiments herein, a problem with exiting methods will first be identified and discussed.

As explained earlier, in existing methods, 3GPP does not specify any solution to provide the requested authorization framework. This means that each vendor may need to provide a proprietary solution, that may be e.g., directly based on configuration or by Operation and Maintenance (O&M) tools.

This lack of convergence is always costly to operators, that prefer to have a standard and extensible solution, not vendor proprietary ones.

Several embodiments are comprised herein, which address the limitations of the existing methods. As an overview, embodiments herein may be understood to be drawn to providing a 5G UDR authorization framework service. In general, embodiments herein may be understood as relating to a 3GPP standard authorization framework for UDR, to support 5G requirements.

The embodiments will now be described more fully hereinafter with reference to the accompanying drawings, in which examples are shown. In this section, embodiments herein are illustrated by exemplary embodiments. It should be noted that these embodiments are not mutually exclusive. Components from one embodiment or example may be tacitly assumed to be present in another embodiment or example and it will be obvious to a person skilled in the art how those components may be used in the other exemplary embodiments.

Figure 1:
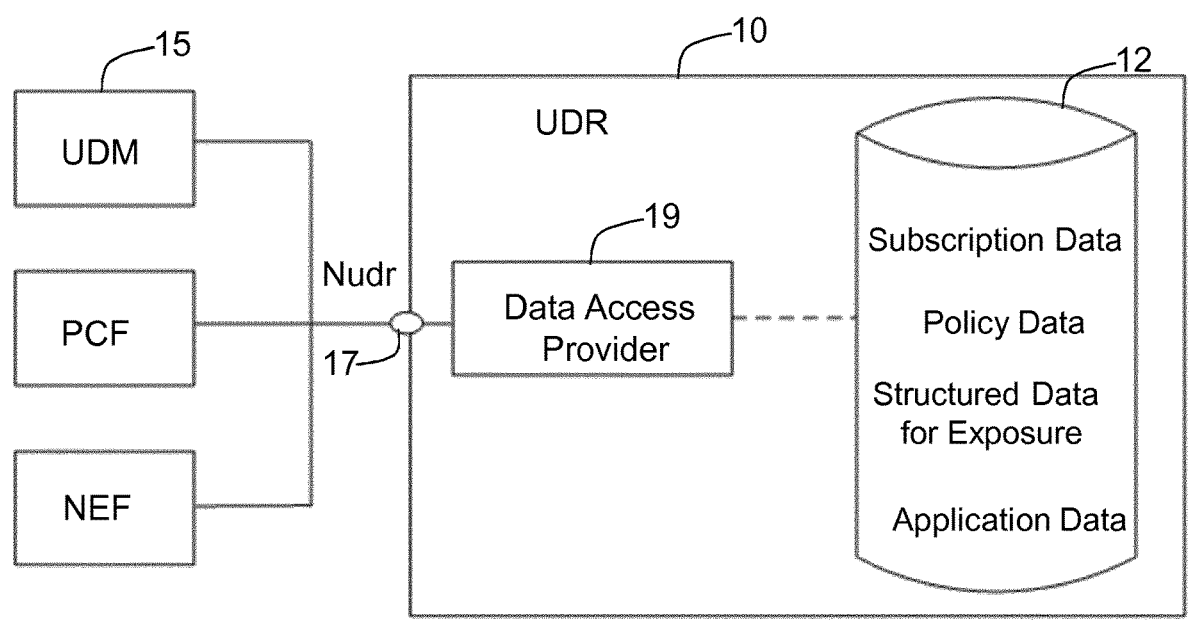
FIG. 1 is a schematic diagram illustrating 5G UDR contents and consumers.
Figure 2:
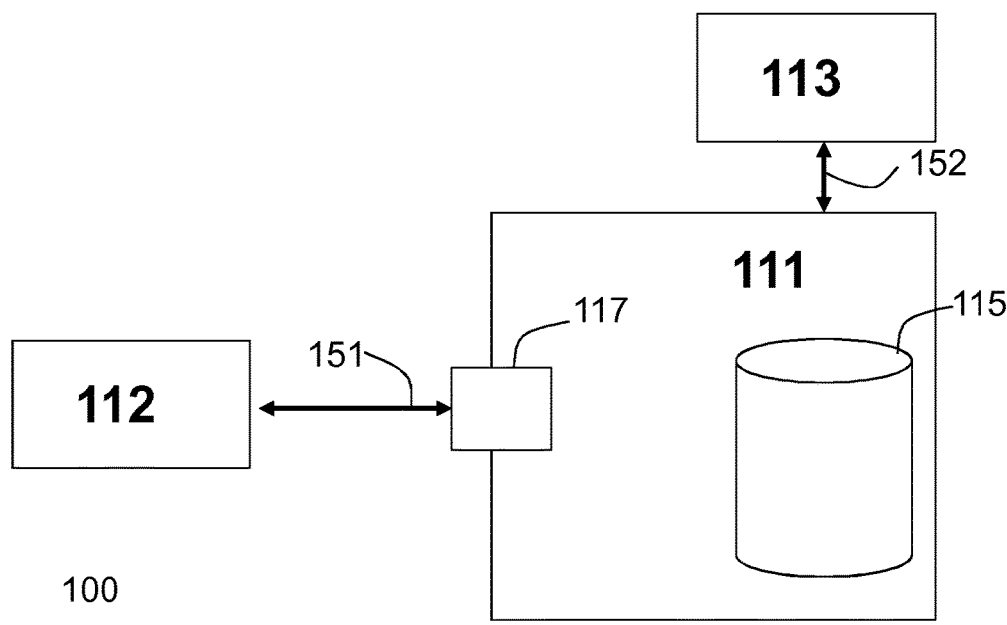
FIG. 2 is a schematic diagram illustrating two non-limiting examples in a) and b), respectively, of a communications network, according to embodiments herein.
Figure 2:
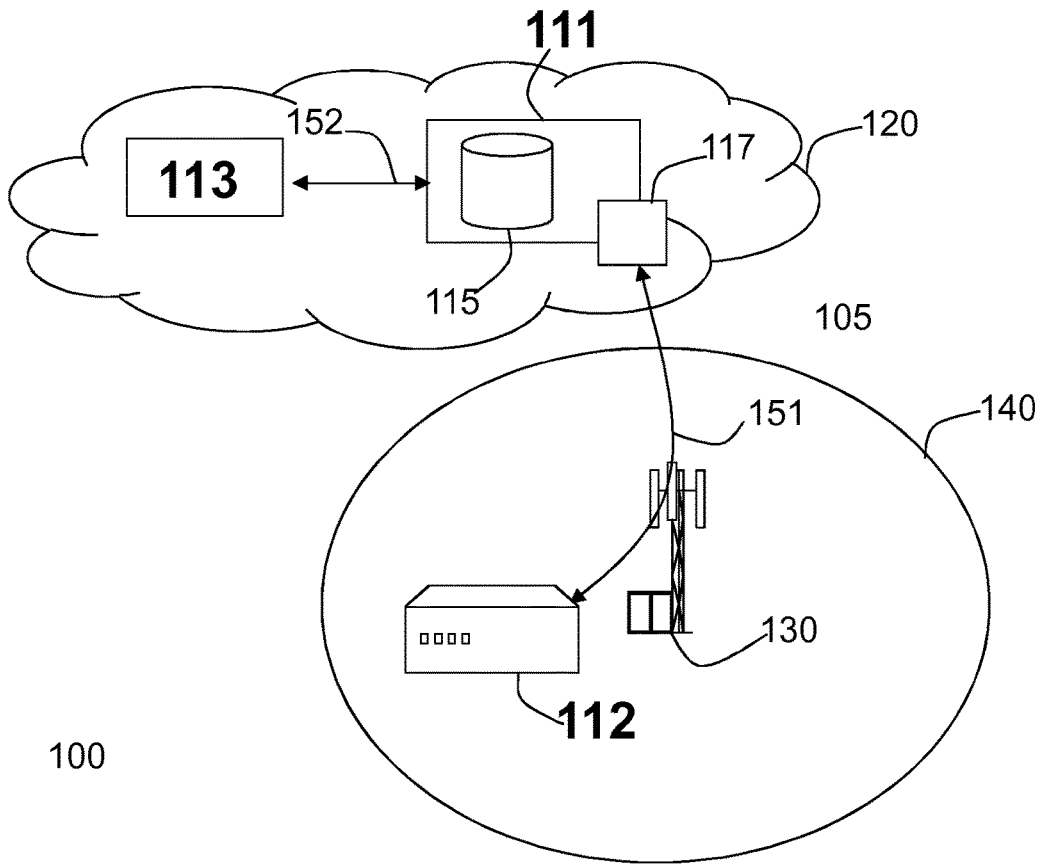

FIG. 2 depicts two non-limiting examples, in panels "a" and "b", respectively, of a communications network 100, in which embodiments herein may be implemented. In some example implementations, such as that depicted in the non-limiting example of FIG. 2a), the communications network 100 may be a computer network. The communications network 100 supports a 5G System, or a system with similar functionality. In other example implementations, such as that depicted in the non-limiting example of FIG. 2b), the communications network 100 may be implemented in a telecommunications network 105, sometimes also referred to as a cellular radio system, cellular network or wireless communications system. In some examples, the telecommunications network 105 may comprise network nodes which may serve receiving nodes, such as wireless devices, with serving beams.

The telecommunications network 105 may for example be a Narrow-Band IoT (NB-IoT) network, a Category M1 (CATM) network, a Global System for Mobile communications (GSM) network, or another Internet service provider (ISP)-oriented network.

In some examples, the telecommunications network 105 may for example be a network such as a 5G system, a 5G Core Network (5GC), or a Next Gen network. The telecommunications network 105 may also support other technologies, such as a Long-Term Evolution (LTE) network, e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), IEEE 802.15.4-based low-power short-range networks such as IPv6 over Low-Power Wireless Personal Area Networks (6LowPAN), Zigbee, Z-Wave, Bluetooth Low Energy (BLE), or any cellular network or system.

The communications network 100 comprises a plurality of nodes, whereof a first node 111, a second node 112, and a third node 113 are depicted in FIG. 2. Each of the first node 111, the second node 112 and the third node 113 may be understood, respectively, as a first computer system, a second computer system and a third computer system. The first node 111 comprises a database 115, which may be accessed via an interface 117. The first node 111 is a service producer of the database 115, e.g., a node managing a UDR, or a node supporting similar functionality. The first node 111 may therefore be considered to manage a NF that provides SBA service. In some examples the first node 111 may provide an SBA service that may be run independently of a NF. In some particular examples, the first node 111 may manage a Nudr service, which may run without the "existence" of the an NF as a container.

The second node 112 may be understood as a service consumer, such as a UDM. The third node 113 may be understood as a Provisioning entity. A Provisioning entity may be understood as a node that may be understood to be enabled to provide a value to internal attributes/parameters of a system by centralized methods, normally for the attributes/parameters that may keep a permanent value or to provide an initial value that may vary by system functioning.

In some examples, any of the first node 111, the second node 112 and the third node 113 may be implemented, as depicted in the non-limiting example of FIGS. 2a) and 2b), as a standalone server in e.g., a host computer in the cloud 120. Any of the first node 111, the second node 112 and the third node 113 may in some examples be a distributed node or distributed server, with some of their respective functions being implemented locally, e.g., by a client manager, and some of its functions implemented in the cloud 120, by e.g., a server manager. Yet in other examples, any of the first node 111, the second node 112 and the third node 113 may also be implemented as processing resources in a server farm. Any of the first node 111, the second node 112 and the third node 113 may be under the ownership or control of a service provider, or may be operated by the service provider or on behalf of the service provider.

Any of the first node 111, the second node 112 and the third node 113 may be enabled to communicate wirelessly in the communications network 100 and, in some particular examples, may be able support beamforming transmission. The communication may be performed e.g., via a RAN and possibly one or more core networks, comprised within the communications network 100.

The telecommunications network 105 may cover a geographical area, which in some embodiments may be divided into cell areas, wherein each cell area may be served by a radio network node 130, although, one radio network node may serve one or several cells. In the example of FIG. 2b, the radio network node 130 serves a cell 140. The radio network node 130 may be e.g., a gNodeB. That is, a transmission point such as a radio base station, for example an eNodeB, or a Home Node B, a Home eNode B or any other network node capable to serve a wireless device, such as a user equipment or a machine type node in the communications network 100. The radio network node 130 may be of different classes, such as, e.g., macro eNodeB, home eNodeB or pico base station, based on transmission power and thereby also cell size. In some examples, the radio network node may serve receiving nodes with serving beams. The radio network node 130 may support one or several communication technologies, and its name may depend on the technology and terminology used. Any of the radio network nodes that may be comprised in the communications network 100 may be directly connected to one or more core networks.

The first node 111 is configured to communicate within the communications network 100 with the second node 112 over a first link 151, e.g., a radio link, an infrared link, or a wired link. The first link 151 may be understood to be comprised of a plurality of individual links. The first node 111 is configured to communicate within the communications network 100 with the third node 113 over a second link 152, e.g., a radio link, an infrared link, or a wired link. The second link 152 may be understood to be comprised of a plurality of individual links.

Any of the first link 151 and the second link 152 may be a direct link or it may go via one or more computer systems or one or more core networks in the communications network 100, which are not depicted in FIG. 2, or it may go via an optional intermediate network. The intermediate network may be one of, or a combination of more than one of, a public, private or hosted network; the intermediate network, if any, may be a backbone network or the Internet; in particular, the intermediate network may comprise two or more sub-networks, which is not shown in FIG. 2.

In general, the usage of "first", "second", etc. herein may be understood to be an arbitrary way to denote different elements or entities, and may be understood to not confer a cumulative or chronological character to the nouns they modify.

Figure 3:
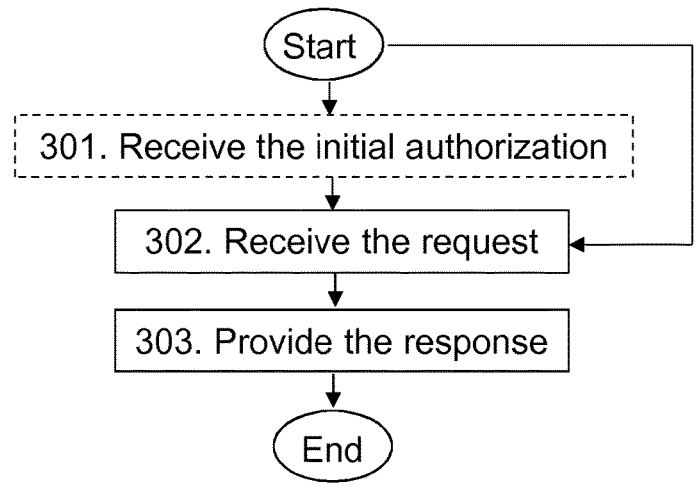
FIG. 3 is a flowchart depicting embodiments of a method in a first node, according to embodiments herein.

Embodiments of a method performed by the first node 111 will now be described with reference to the flowchart depicted in FIG. 3. The method may be understood to be for managing data in the database 115 in the communications network 100. The first node 111 operates in the communications network 100. In some embodiments, the communications network may be a Fifth Generation (5G) network and the database 115 may be a Unified Data Repository (UDR). The first node 111 may then be considered to manage the UDR.

The method may comprise the actions described below. In some embodiments, some of the actions may be performed. In some embodiments, all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 3, an optional action is indicated with a dashed box.

Action 301

As stated earlier, the first node 111 comprises the database 115, which comprises data. The first node 111 is the service producer of the database 115. The second node 112 is a service consumer. A consumer such as the second node 112, may be, for example, a NF, a NF service, a service, or even a service instance or a NF service instance.

In the course of operations of the communications network 100, the first node 111 may receive a request from the second node 112 to manage the data in the database 115. Management of the data in the database 115 may be understood to be performed according to an authorization to manage the data in the database 115, which authorization may have been assigned to the second node 112 in accordance with an authorization framework. The authorization framework may define access rights, and policies of access and manipulation, of the data stored in the database 115, which service consumers such as the second node 112 may have. That is, the authorization framework may define which operations may be allowed to be performed on the database 115, to which data in the database 115, and by which consumers. That is, the framework may be understood as a context, means, rules, and operations defining how the database 115 may be managed.

The third node 113 is an initial provisioner, or "Provisioning entity", of the authorization. In this Action 301, the first node 111 may receive, from the third node 113, an initial authorization for the second node 112 to manage the data in the database 115. The receiving in this Action 301 may be performed, e.g., via the second link 152.

The receiving in this Action 301 of the initial authorization may be performed as a first service operation of a set of service operations.

The set of service operations may comprise one or more service operations to manage the data of: Query, Create, Delete, Update, Subscribe, and Notify, as defined e.g., in 3GPP TS 23.501 v15.2.0 or 3GPP TS 23.502 v15.2.0.

Each of the service operations may use operation semantics comprising one of: a request and a response, as defined e.g., in 3GPP TS 23.501 v15.2.0 or 3GPP TS 23.502 v15.2.0.

For example, the authorization framework may be defined in the interface 117 of the database 115, supported by the definition of a new service. The interface 117 of the database 115 may be a service-based interface, such as e.g., the Nudr. In that case, the authorization framework may be defined in the Nudr interface 117, supported by the definition of a new Nudr service, which may be called, for example, Nudr_AuthorizationFw. Following the same approach used by 3GPP, the definition of the authorization framework may be as depicted in Table 2:

TABLE 2

AuthorizationFw service operations

| NF service | Service Operations | Operation Semantics | Example Consumer(s) |
|---|---|---|---|
| Authorization Fw | Query | Request/Response | UDM, PCF |
| | Create | Request/Response | UDM |
| | Delete | Request/Response | UDM |
| | Update | Request/Response | UDM, PCF |
| | Subscribe | Request/Response | UDM, PCF |
| | Notify | Request/Response | UDM, PCF |

For each service operation, an input parameter may be defined at least to specify the following. First, whether a service consumer may be allowed/not allowed to execute an operation. This may apply to different operations. Second, which permissions may be defined for each service consumer. For example, it may be defined which service consumers may be allowed to execute each service operation, e.g., Nudr_AuthorizationFw service operation. As an example, the PCF may only be allowed to read authorization of information, but not to modify it, neither to create or delete. As another example, the permissions may define the service operations, which may refer to Nudr_UnifiedDataManagement service defined operations, as in the Table 1 above. It may refer to other operations that may be defined for manipulations of data. Third, an input parameter may be defined to specify to which data each operation applies.

Currently, in Nudr, four Data Sets may be defined (see clause 4.2.5, in [1]): Subscription Data, Policy Data, Structured data for exposure and Application Data.

For each Data Set, several Data Sub sets may be defined, according to embodiments herein. For example, for Subscription Data, the data sets may be as depicted in Table 3, according to embodiments herein:

TABLE 3

Nudr DM service Data Sets

| Data Set | Data Subset | Data Key | Data Sub Key |
|---|---|---|---|
| Subscription Data (see clause 5.2.3.3.1) | Access and Mobility Subscription data | SUPI | — |
| | SMF Selection Subscription data | SUPI | — |
| | UE context in SMF data | SUPI | S-NSSAI DNN |
| | SMS Management Subscription data | SUPI | — |
| | SMS Subscription data | SUPI | |
| | Session Management Subscription data | SUPI | S-NSSAI DNN |
| | Slice Selection Subscription data | SUPI | — |

Further information may be added to this table in 3GPP, to cover some more Data Subsets and a rest of Data Sets. A Key may be understood as an input that may be used to find the data to be accessed.

Then, the data to which the permission(s), for corresponding consumer(s), may apply may be identified by Data Set+Data Key(s)+optionally Data Subset(s)+optionally Data Sub-Key(s), for each Data Subset. See Nudr_UnifiedDataManagement service definition in 5.2.3.3 in [2], that may be complemented to just agreed S2-182793.

To ease the understanding of embodiments herein, the following non-limiting example of the definition of one operation, here Nudr_DM_Query, may be considered:

5.2.12.2.2 Nudr_DM_Query service operation
Service operation name: Nudr_DM_Query.
Description: NF service consumer requests a set of data from UDR.
Inputs, Required: Data Set Identifier, Data Key(s).
Inputs, Optional: Data Subset Identifier(s), Data Sub Key(s) (for each Data Subset, see clause 5.2.12.2.1).
Outputs, Required: Requested data.
Outputs, Optional: None.
Action 302

Normally only the third node 113, as Provisioning entity, may be entitled to use the Create/Delete operations, to define initially the authorization framework settings. The second node 112, e.g., a node managing a UDM, may be considered the place to perform data validation or authorization, based on e.g., subscription data. However, to some extent, the second node 112 may then assume some Provisioning entity functionality, and may want to modify its own authorization. That is, the authorization framework may then be used by e.g., a consumer such as the second node 112, which may act as provisioning entity, to define authorization permissions, for each consumer and for different data granularity.

In accordance with this, in this Action 302, the first node 111 receives a request from the second node 112 operating in the communications network 100. The request is to modify an authorization to manage the data in the database 115. The request is received as a service operation, of the set of service operations provided by a service of the database 115. That is, the request from the second node 112 may be received as a second service operation.

The service may be a network function service.

In some embodiments, the authorization to be modified may be for example, the authorization defined by the third node 113 that may have been received from the third node 113 in Action 301, which may be considered the initial authorization.

However, in other examples, the authorization that the second node 112 may request to modify, may be an earlier version of the authorization, as already modified by the second node 112 itself. That is, the initial authorization may define a set of rules or permissions that may dictate what, when and/or how the second node 112 may be allowed to modify the authorization to manage the data in the database 115. Then, based on the initial authorization, the second node 112 may autonomously modify its authorization.

In some embodiments, the request may be received by the first node 111 via the Nudr interface 117 of the database 115. The receiving in this Action 302 may be performed, e.g., via the first link 151.

As an example, the second node 112 may be managing a UDM. The first node 111 may receive, from the second node 112, the request, using Nudr_AuthorizationFw_Create, with the following input parameters:

Consumers: ConsumerX

Permissions: Read allowed (rest of operations are not allowed)

Data: DataSet=Subscription data

In this example, ConsumerX is only allowed to Read, and only Subscription data, in this case, for any subscriber, as Data Keys and Data SubKeys are not defined. The rest of the data and operations are not allowed.

But, it may be considered to be even of more interest, that a consumer, such as the second node 112, may be allowed to modify authorization permissions, for some data, based on some application/business logic of that particular consumer.

For example, some data may only be readable, or writable, when a UE is registered in one type of access, e.g., 3GPP access or non-3GPP access. This case may be implemented as follows: UDM business logic may be responsible to carry out UE registration in UDM for an Access Type, then, when a UE is registered for non-3GPP access, for example, the first node 111 may receive, from the second node 112, a request, using Nudr_AuthorizationFw_Update with the following input parameters, as a non-limiting example:

Consumers: PCF, other consumers?

Permissions: Read allowed (rest of operations are not allowed)

Data: DataSet=Subscription data; Data SubSet=Access and Mobility Subscription data; Data Key=SUPI (for that UE).

Action 303

In this Action 303, the first node 111 provides a response to the second node 112. The response is based on the received request. The response is further based on the authorization as defined by the third node 113 operating in the communications network 100, that is, on the initial authorization.

In some embodiments, the provided response may be based on at least one of: an identity of the second node 112; b) a type of service operation requested to be performed by the second node 112; c) a granularity of the data in the database 115 to be managed based on the authorization; and d) an identity of one or more: user equipments, subscribers or application the data is to be managed for.

The type of service operation may be understood as one of: Query, Create, Delete, Update, Subscribe, and Notify, as defined e.g., in 3GPP TS 23.501 v15.2.0 or 3GPP TS 23.502 v15.2.0.

The granularity of the data may be at a level of at least one of: data set, data subset, and one or more single attributes of the data.

A data set may comprise at least one of: Subscription Data, Policy Data, Structured Data for exposure, and Application Data.

The response may be provided by the first node 111 via the Nudr interface 117 of the database 115. The providing in this Action 303 may be performed, e.g., via the first link 151.

Figure 4:
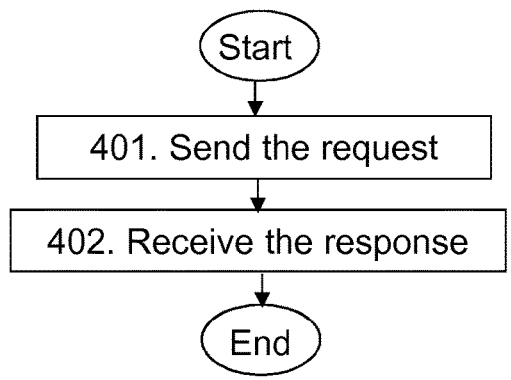
FIG. 4 is a flowchart depicting embodiments of a method in a second node, according to embodiments herein.

Embodiments of method performed by the second node 112 will now be described with reference to the flowchart depicted in FIG. 4. The method may be understood to be for managing the data in the database 115 in the communications network 100. The second node 112 operates in the communications network 100.

The method comprises the actions described below. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

The detailed description of some of the following corresponds to the same references provided above, in relation to the actions described for the first node 111, and will thus not be repeated here to simplify the description. For example, in some embodiments, the communications network 100 may be a Fifth Generation (5G) network and the database 115 may be a Unified Data Repository (UDR). The first node 111 may then be considered to manage the UDR.

Action 401

In this Action 401, the second node 112 sends the request to the first node 111 operating in the communications network 100. The request is to modify the authorization to manage the data in the database 115. The request is sent as a service operation of the set of service operations provided by a service of the database 115.

The service may be, in some embodiments, a network function service.

The set of service operations may comprise one or more service operations to manage the data of: Query, Create, Delete, Update, Subscribe, and Notify, as defined e.g., in 3GPP TS 23.501 v15.2.0 or 3GPP TS 23.502 v15.2.0.

Each of the service operations may use operation semantics comprising one of: a request and a response, as defined e.g., in 3GPP TS 23.501 v15.2.0 or 3GPP TS 23.502 v15.2.0.

In some embodiments, the request may be sent by the second node 112 via the Nudr interface 117 of the database 115. The sending in this Action 401 may be performed, e.g., via the first link 151.

In some embodiments, the authorization to be modified may be for example, the authorization defined by the third node 113 that may have been received from the third node 113 in Action 301, which may be considered the initial authorization.

However, in other examples, the authorization that the second node 112 may request to modify, may be an earlier version of the authorization, as already modified by the second node 112 itself.

Action 402

In this Action 402, the second node 112 receives the response from the first node 111. The response is based on the sent request. The response is further based on the authorization as defined by the third node 113 operating in the communications network 100. As described earlier, the first node 111 is a service producer of the database 115, the second node 112 is a service consumer, and the third node 113 is the initial provisioner of the authorization.

In some embodiments, the received response may be based on at least one of: the identity of the second node 112; b) the type of service operation requested to be performed by the second node 112; c) the granularity of the data in the database 115 to be managed based on the authorization; and d) the identity of one or more: user equipments, subscribers or application the data is to be managed for.

The type of service operation may be understood as one of: Query, Create, Delete, Update, Subscribe, and Notify, as defined e.g., in 3GPP TS 23.501 v15.0.0 or 3GPP TS 23.502 v15.0.0.

The granularity of the data may be at a level of at least one of: data set, data subset, and one or more single attributes of the data.

The data set may comprise at least one of: Subscription Data, Policy Data, Structured Data for exposure, and Application Data.

The response may be received by the second node 112 via the Nudr interface 117 of the database 115. The receiving in this Action 402 may be performed, e.g., via the first link 151.

Figure 5:
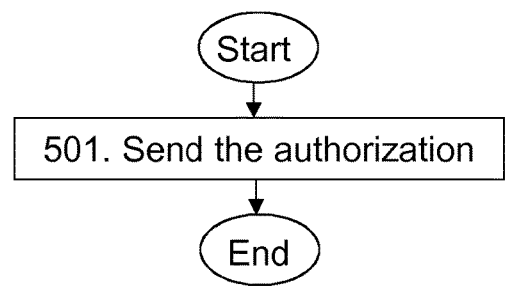
FIG. 5 is a flowchart depicting embodiments of a method in a third node, according to embodiments herein.

Embodiments of method performed by the third node 113 will now be described with reference to the flowchart depicted in FIG. 5. The method may be understood to be for managing the data in the database 115 in the communications network 100. The third node 113 operates in the communications network 100.

The method comprises the action described below. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

The detailed description of some of the following corresponds to the same references provided above, in relation to the actions described for the first node 111, and will thus not be repeated here to simplify the description. For example, in some embodiments, the communications network 100 may be a Fifth Generation (5G) network and the database 115 may be a Unified Data Repository (UDR). The first node 111 may then be considered to manage the UDR.

Action 501

In this Action 501, the third node 113 sends, to the first node 111 operating in the communications network 100, the authorization for the second node 112 operating in the communications network 100 to manage the data in the database 115. The authorization, which may be also referred to herein as the initial authorization, is sent as a service operation of the set of service operations provided by the service of the database 115. The first node 111 is a service producer of the database 115, the second node 112 is a service consumer, and the third node 113 is an initial provisioner of the authorization.

The service may be, in some embodiments, a network function service. In some particular embodiments, the first node 111 may manage a UDR, and the service may be a network function service.

The set of service operations may comprise one or more service operations to manage the data of: Query, Create, Delete, Update, Subscribe, and Notify, as defined e.g., in 3GPP TS 23.501 v15.2.0 or 3GPP TS 23.502 v15.2.0.

Each of the service operations may use operation semantics comprising one of: a request and a response, as defined e.g., in 3GPP TS 23.501 v15.2.0 or 3GPP TS 23.502 v15.2.0.

In some embodiments, the sent authorization may be based on at least one of: the identity of the second node 112; b) the type of service operation requested to be performed by the second node 112; c) the granularity of the data in the database 115 to be managed based on the authorization; and d) the identity of the one or more: user equipments, subscribers or application the data is to be managed for.

The type of service operation may be understood as one of: Query, Create, Delete, Update, Subscribe, and Notify, as defined e.g., in 3GPP TS 23.501 v15.2.0 or 3GPP TS 23.502 v15.2.0.

The granularity of the data may be at a level of at least one of: data set, data subset, and one or more single attributes of the data.

The data set may comprise at least one of: Subscription Data, Policy Data, Structured Data for exposure, and Application Data.

The authorization may be sent by the third node 113 via the Nudr interface 117 of the database 115. The sending in this Action 501 may be performed, e.g., via the second link 152.

One advantage of embodiments herein is that they provide for a 3GPP Standard authorization framework definition. That is, embodiments herein provide for a standard versus a proprietary implementation to handle authorizations for managing data in a database. Moreover, embodiments herein enable the possibility to modify an authorization framework, that is, a definition of e.g., access rights, such as which operations are allowed, to which data and which consumers, based on dynamic network activity.

Figure 6:
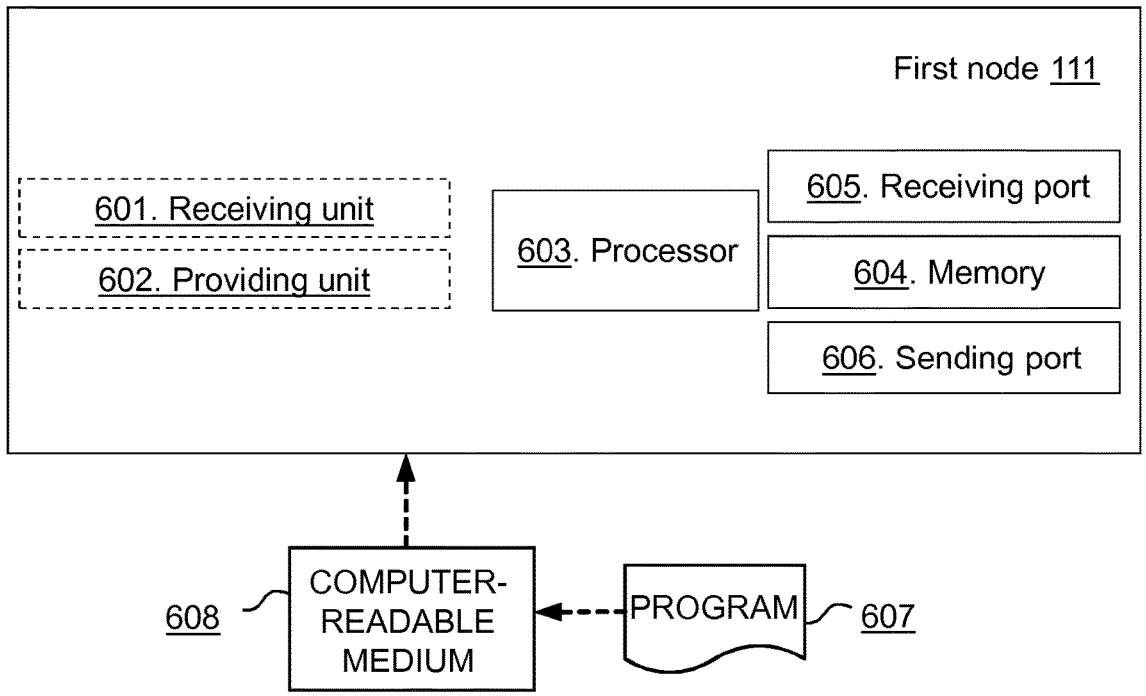
FIG. 6 is schematic block diagram illustrating two non-limiting examples, a) and b), of a first node, according to embodiments herein.
Figure 6:
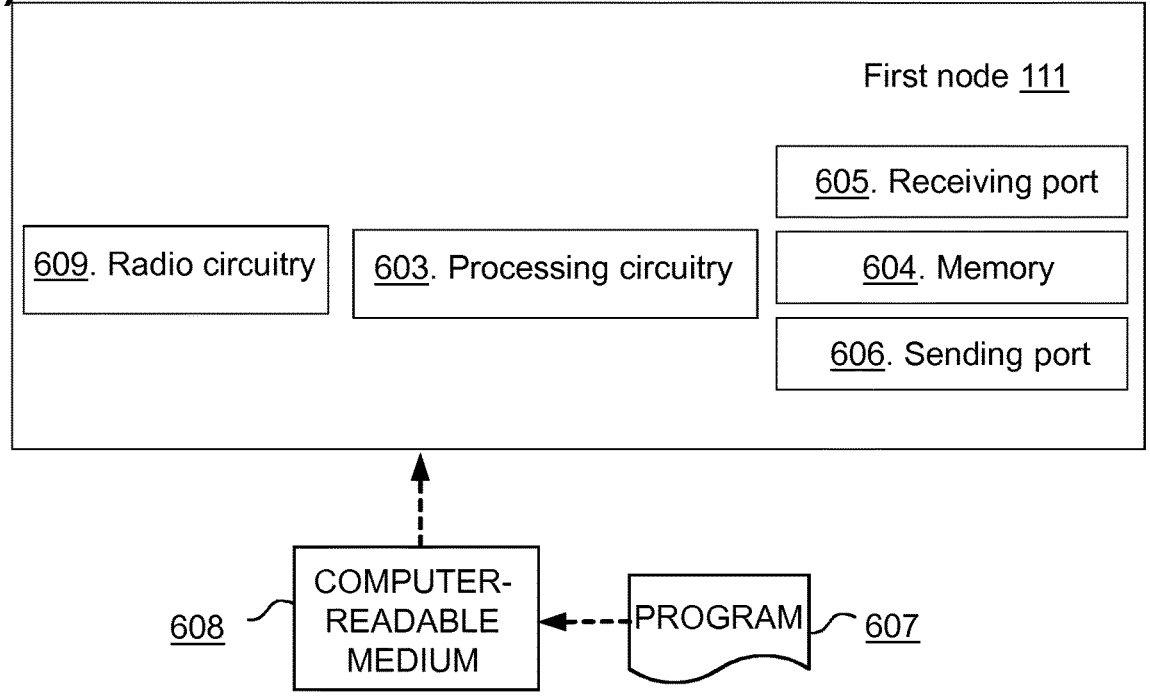

FIG. 6 depicts two different examples in panels a) and b), respectively, of the arrangement that the first node 111 may comprise to perform the method actions described above in relation to FIG. 3. The first node 111 is configured to manage the data in the database 115 in the communications network 100. The first node 111 is configured to operate in the communications network 100.

The detailed description of some of the following corresponds to the same references provided above, in relation to the actions described for the first node 111, and will thus not be repeated here. For example, the first node 111 may be configured to manage a UDR.

In some embodiments, the first node 111 may comprise the following arrangement depicted in FIG. 6a.

The first node 111 is configured to, e.g. by means of a receiving unit 601 within the first node 111 configured to, receive the request from the second node 112 configured to operate in the communications network 100. The request is configured to modify the authorization to manage the data in the database 115. The request is configured to be received as a service operation of the set of service operations configured to be provided by the service of the database 115.

As described earlier, in some embodiments, the set of service operations may comprise one or more service operations to manage the data of: Query, Create, Delete, Update, Subscribe, and Notify.

In some embodiments, each of the service operations may be configured to use operation semantics comprising one of: a request and a response.

The first node 111 is also configured to, e.g. by means of a providing unit 602 within the first node 111 configured to, provide the response to the second node 112. The response is configured to be based on the request configured to be received. The response is further configured to be based on the authorization as defined by the third node 113 configured to operate in the communications network 100. The first node 111 is configured to be the service producer of the database 115. The second node 112 is configured to be the service consumer, and the third node 113 is configured to be the initial provisioner of the authorization.

In some embodiments, the response configured to be provided may be configured to be based on at least one of: a) the identity of the second node 112; b) the type of service operation configured to be requested to be performed by the second node 112; c) the granularity of the data in the database 115 to be managed based on the authorization; and d) the identity of the one or more: user equipments, subscribers or application the data is to be managed for.

The granularity of the data may be configured to be at a level of at least one of: data set, data subset, and one or more single attributes of the data.

The data set may comprise at least one of: Subscription Data, Policy Data, Structured Data for exposure, and Application Data.

In some embodiments, the authorization that may be configured to be defined by the third node 113 may be an initial authorization. In such embodiments, the first node 111 may be further configured to, e.g. by means of the receiving unit 601 within the first node 111 configured to, receive, from the third node 113, the initial authorization for the second node 112 to manage the data in the database 115. The receiving of the initial authorization may be configured to be performed as a first service operation of the set of service operations, and the request from the second node 112 may be configured to be received as a second service operation.

In some embodiments, the database 115 may be a UDR.

In some embodiments, the communications network may be a 5G network, and the first node 111 may be configured to comprise a UDR.

The first node 111 may be configured to manage the UDR, and the service may be configured to be a network function service.

In some embodiments the request may be configured to be received by the first node 111 via a Nudr interface 117 of the database 115.

The embodiments herein may be implemented through one or more processors, such as a processor 603 in the first node 111 depicted in FIG. 6a, together with computer program code for performing the functions and actions of the embodiments herein. The processor 603 may be understood herein to be a hardware component. The program code mentioned above may also be provided as a computer program product, for instance in the form of a data carrier carrying computer program code for performing the embodiments herein when being loaded into the in the first node 111. It is however feasible with other data carriers such as a memory stick. The computer program code may furthermore be provided as pure program code on a server and downloaded to the first node 111.

The first node 111 may further comprise a memory 604 comprising one or more memory units. The memory 604 is arranged to be used to store obtained information, store data, configurations, schedulings, and applications etc. to perform the methods herein when being executed in the first node 111.

In some embodiments, the first node 111 may receive information from, e.g., the second node 112 and/or the third node 113, through a receiving port 605. In some examples, the receiving port 605 may be, for example, connected to one or more antennas in first node 111. In other embodiments, the first node 111 may receive information from another structure in the communications network 100 through the receiving port 605. Since the receiving port 605 may be in communication with the processor 603, the receiving port 605 may then send the received information to the processor 603. The receiving port 605 may also be configured to receive other information.

The processor 603 in the first node 111 may be further configured to transmit or send information to e.g., the second node 112 and/or the third node 113, through a sending port 606, which may be in communication with the processor 603, and the memory 604.

Any of the receiving unit 601, and the providing unit 602 may be the processor 603 of the first node 111, or an application running on such processor.

Those skilled in the art will also appreciate that the receiving unit 601, and the providing unit 602 described above may refer to a combination of analog and digital circuits, and/or one or more processors configured with software and/or firmware, e.g., stored in memory, that, when executed by the one or more processors such as the processor 603, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Thus, the methods according to the embodiments described herein for the first node 111 may be respectively implemented by means of a computer program 607 product, comprising instructions, i.e., software code portions, which, when executed on at least one processor 603, cause the at least one processor 603 to carry out the actions described herein, as performed by the first node 111. The computer program 607 product may be stored on a computer-readable storage medium 608. The computer-readable storage medium 608, having stored thereon the computer program 607, may comprise instructions which, when executed on at least one processor 603, cause the at least one processor 603 to carry out the actions described herein, as performed by the first node 111. In some embodiments, the computer-readable storage medium 608 may be a non-transitory computer-readable storage medium, such as memory stick, or stored in the cloud space. In other embodiments, the computer program 607 product may be stored on a carrier containing the computer program, wherein the carrier is one of an electronic signal, optical signal, radio signal, or the computer-readable storage medium 608, as described above.

The first node 111 may comprise an interface unit to facilitate communications between the first node 111 and other nodes or devices, e.g., the second node 112, and/or the third node 113. In some particular examples, the interface may, for example, include a transceiver configured to transmit and receive radio signals over an air interface in accordance with a suitable standard.

In other embodiments, the first node 111 may comprise the following arrangement depicted in FIG. 6b. The first node 111 may comprise a processing circuitry 603, e.g., one or more processors such as the processor 603, in the first node 111 and the memory 604. The first node 111 may also comprise a radio circuitry 609, which may comprise e.g., the receiving port 605 and the sending port 606. The processing circuitry 603 may be configured to, or operable to, perform the method actions according to FIG. 3, in a similar manner as that described in relation to FIG. 6a. The radio circuitry 609 may be configured to set up and maintain at least a wireless connection with, e.g., the second node 112, and/or the third node 113. Circuitry may be understood herein as a hardware component.

Hence, embodiments herein also relate to the first node 111 operative to operate in the communications network 100. The first node 111 may comprise the processing circuitry 603 and the memory 604, said memory 604 containing instructions executable by said processing circuitry 603, whereby the first node 111 is further operative to perform the actions described herein in relation to the first node 111, e.g., in FIG. 3.

Figure 7:
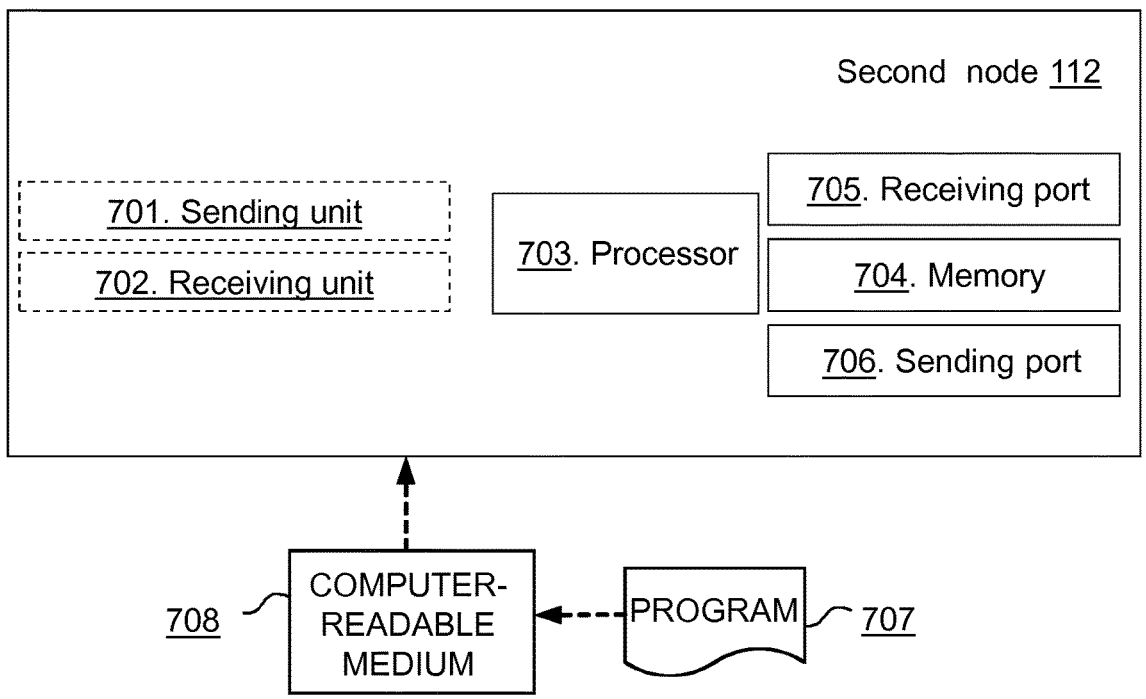
FIG. 7 is schematic block diagram illustrating two non-limiting examples, a) and b), of a second node, according to embodiments herein.
Figure 7:
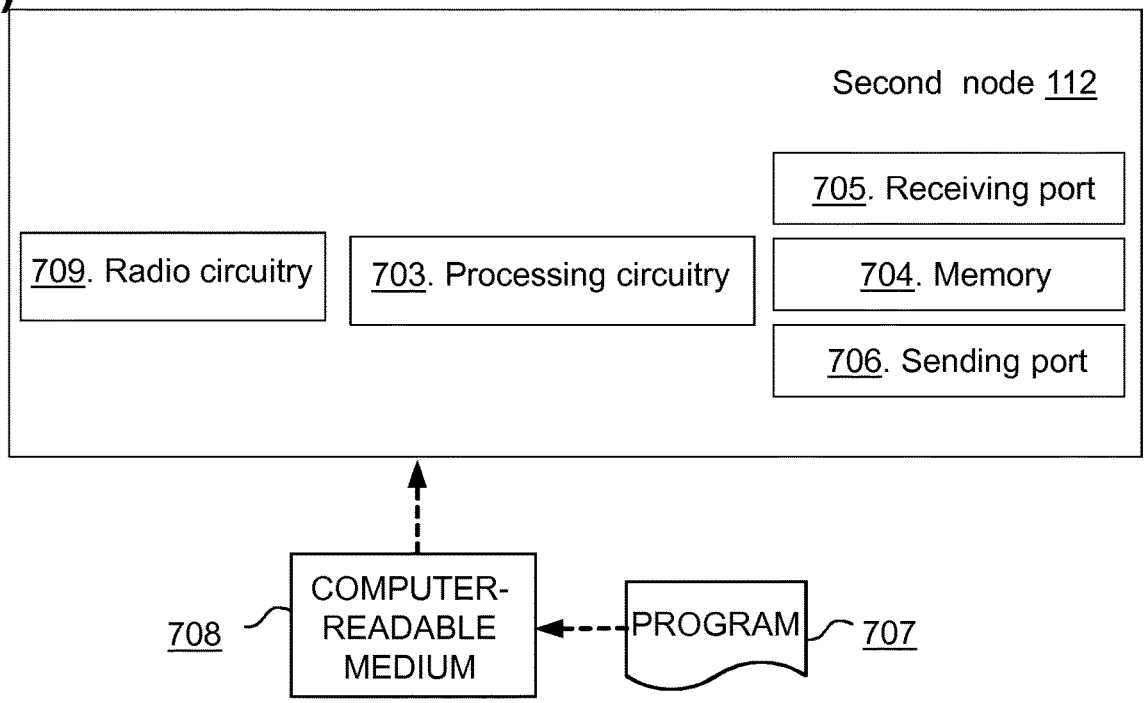

FIG. 7 depicts two different examples in panels a) and b), respectively, of the arrangement that the second node 112 may comprise to perform the method actions described above in relation to FIG. 4. The second node 112 is configured to manage the data in the database 115 in the communications network 100. The second node 112 is configured to operate in the communications network 100.

The detailed description of some of the following corresponds to the same references provided above, in relation to the actions described for the first node 111, and will thus not be repeated here. For example, the database 115 may be a UDR.

In some embodiments, the second node 112 may comprise the following arrangement depicted in FIG. 7a.

The second node 112 is configured to, e.g. by means of a sending unit 701 within the second node 112 configured to, send the request to the first node 111 configured to operate in the communications network 100. The request may be configured to be to modify the authorization to manage the data in the database 115. The request may be configured to be sent as a service operation of the set of service operations configured to be provided by the service of the database 115.

In some embodiments, the service may be configured to be a network function service.

As described earlier, in some embodiments, the set of service operations may comprise the one or more service operations to manage the data of: Query, Create, Delete, Update, Subscribe, and Notify.

In some embodiments, each of the service operations may be configured to use operation semantics comprising one of: a request and a response.

In some embodiments, the request may be configured to be sent by the second node 112 via a Nudr interface 117 of the database 115.

The second node 112 is also configured to, e.g. by means of a receiving unit 702 within the second node 112 configured to, receive the response from the first node 111. The response is configured to be based on the request configured to be sent. The response is further configured to be based on the authorization as configured to be defined by the third node 113 configured to operate in the communications network 100. The first node 111 is configured to be the service producer of the database 115. The second node 112 is configured to be the service consumer. The third node 113 is configured to be the initial provisioner of the authorization.

In some embodiments, the response configured to be received may be configured to be based on at least one of: a) the identity of the second node 112; b) the type of service operation configured to be requested to be performed by the second node 112; c) the granularity of the data in the database 115 to be managed based on the authorization; and d) the identity of the one or more: user equipments, subscribers or application the data is to be managed for.

The granularity of the data may be configured to be at a level of at least one of: data set, data subset, and one or more single attributes of the data.

The data set may comprise at least one of: Subscription Data, Policy Data, Structured Data for exposure, and Application Data.

In some embodiments, the authorization that may be configured to be defined by the third node 113 may be an initial authorization.

In some embodiments, the communications network may be a 5G network, and the first node 111 may be configured to comprise a UDR.

The embodiments herein may be implemented through one or more processors, such as a processor 703 in the second node 112 depicted in FIG. 7a, together with computer program code for performing the functions and actions of the embodiments herein. The processor 703 may be understood herein to be a hardware component. The program code mentioned above may also be provided as a computer program product, for instance in the form of a data carrier carrying computer program code for performing the embodiments herein when being loaded into the in the second node 112. It is however feasible with other data carriers such as a memory stick. The computer program code may furthermore be provided as pure program code on a server and downloaded to the second node 112.

The second node 112 may further comprise a memory 704 comprising one or more memory units. The memory 704 is arranged to be used to store obtained information, store data, configurations, schedulings, and applications etc. to perform the methods herein when being executed in the second node 112.

In some embodiments, the second node 112 may receive information from, e.g., the first node 111 and/or the third node 113, through a receiving port 705. In some examples, the receiving port 705 may be, for example, connected to one or more antennas in second node 112. In other embodiments, the second node 112 may receive information from another structure in the communications network 100 through the receiving port 705. Since the receiving port 705 may be in communication with the processor 703, the receiving port 705 may then send the received information to the processor 703. The receiving port 705 may also be configured to receive other information.

The processor 703 in the second node 112 may be further configured to transmit or send information to e.g., the first node 111 and/or the third node 113, through a sending port 706, which may be in communication with the processor 703, and the memory 704.

Any of the sending unit 701, and the receiving unit 702 may be the processor 703 of the second node 112, or an application running on such processor.

Those skilled in the art will also appreciate that the sending unit 701, and the receiving unit 702 described above may refer to a combination of analog and digital circuits, and/or one or more processors configured with software and/or firmware, e.g., stored in memory, that, when executed by the one or more processors such as the processor 703, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Thus, the methods according to the embodiments described herein for the second node 112 may be respectively implemented by means of a computer program 707 product, comprising instructions, i.e., software code portions, which, when executed on at least one processor 703, cause the at least one processor 703 to carry out the actions described herein, as performed by the second node 112. The computer program 707 product may be stored on a computer-readable storage medium 708. The computer-readable storage medium 708, having stored thereon the computer program 707, may comprise instructions which, when executed on at least one processor 703, cause the at least one processor 703 to carry out the actions described herein, as performed by the second node 112. In some embodiments, the computer-readable storage medium 708 may be a non-transitory computer-readable storage medium, such as memory stick, or stored in the cloud space. In other embodiments, the computer program 707 product may be stored on a carrier containing the computer program, wherein the carrier is one of an electronic signal, optical signal, radio signal, or the computer-readable storage medium 708, as described above.

The second node 112 may comprise an interface unit to facilitate communications between the second node 112 and other nodes or devices, e.g., the first node 111, and/or the third node 113. In some particular examples, the interface may, for example, include a transceiver configured to transmit and receive radio signals over an air interface in accordance with a suitable standard.

In other embodiments, the second node 112 may comprise the following arrangement depicted in FIG. 7b. The second node 112 may comprise a processing circuitry 703, e.g., one or more processors such as the processor 703, in the second node 112 and the memory 704. The second node 112 may also comprise a radio circuitry 709, which may comprise e.g., the receiving port 705 and the sending port 706. The processing circuitry 703 may be configured to, or operable to, perform the method actions according to FIG. 4, in a similar manner as that described in relation to FIG. 7a. The radio circuitry 709 may be configured to set up and maintain at least a wireless connection with, e.g., the first node 111, and/or the third node 113. Circuitry may be understood herein as a hardware component.

Hence, embodiments herein also relate to the second node 112 operative to operate in the communications network 100. The second node 112 may comprise the processing circuitry 703 and the memory 704, said memory 704 containing instructions executable by said processing circuitry 703, whereby the second node 112 is further operative to perform the actions described herein in relation to the second node 112, e.g., in FIG. 4.

Figure 8:
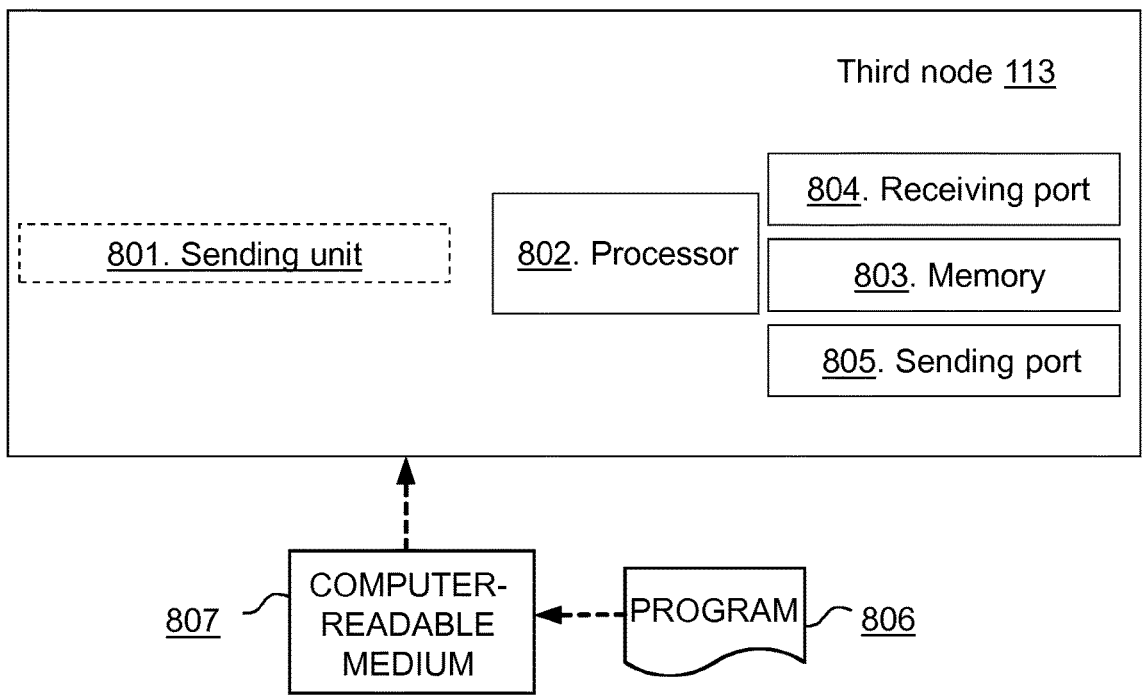
FIG. 8 is a schematic block diagram illustrating two non-limiting examples, a) and b), of a third node, according to embodiments herein.
Figure 8:
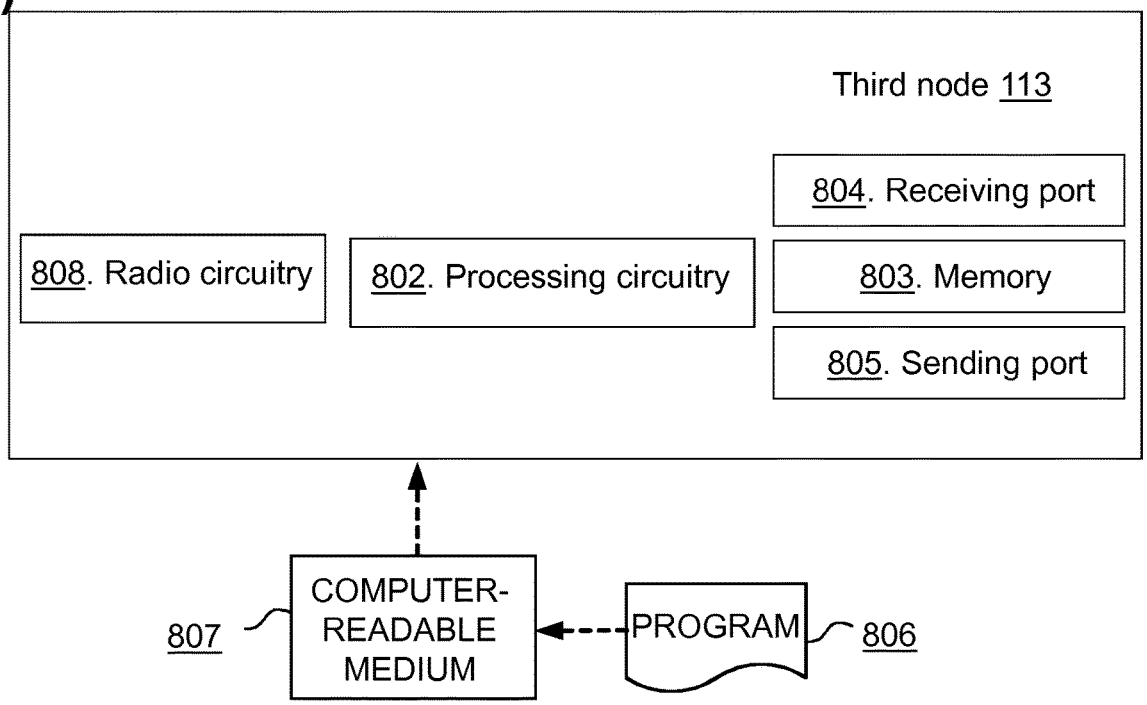

FIG. 8 depicts two different examples in panels a) and b), respectively, of the arrangement that the third node 113 may comprise to perform the method actions described above in relation to FIG. 5. The third node 113 is configured to manage the data in the database 115 in the communications network 100. The third node 113 is configured to operate in the communications network 100.

The detailed description of some of the following corresponds to the same references provided above, in relation to the actions described for the first node 111, and will thus not be repeated here. For example, the database 115 may be a UDR.

In some embodiments, the third node 113 may comprise the following arrangement depicted in FIG. 8a.

The third node 113 is configured to, e.g. by means of a sending unit 801 within the third node 113 configured to, send, to the first node 111 configured to operate in the communications network 100, the authorization for the second node 112 configured to operate in the communications network 100 to manage the data in the database 115. The authorization is configured to be sent as a service operation of the set of service operations configured to be provided by a service of the database 115. The first node 111 is configured to be the service producer of the database 115. The second node 112 is configured to be the service consumer. The third node 113 is configured to be the initial provisioner of the authorization.

In some embodiments, the service may be configured to be a network function service.

As described earlier, in some embodiments, the set of service operations may comprise the one or more service operations to manage the data of: Query, Create, Delete, Update, Subscribe, and Notify.

In some embodiments, each of the service operations may be configured to use operation semantics comprising one of: a request and a response.

In some embodiments, the authorization may be configured to be sent by the third node 113 via the Nudr interface 117 of the database 115.

The first node 111 may be configured to manage a UDR, and the service may be configured to be a network function service.

In some embodiments, the authorization configured to be sent is configured to be based on at least one of: a) the identity of the second node 112; b) the type of service operation configured to be requested to be performed by the second node 112; c) the granularity of the data in the database 115 to be managed based on the authorization; and d) the identity of the one or more: user equipments, subscribers or application the data is to be managed for.

The granularity of the data may be configured to be at a level of at least one of: data set, data subset, and one or more single attributes of the data.

The data set may comprise at least one of: Subscription Data, Policy Data, Structured Data for exposure, and Application Data.

In some embodiments, the authorization that may be configured to be defined by the third node 113 may be an initial authorization.

In some embodiments, the communications network may be a 5G network, and the first node 111 may be configured to comprise a UDR.

The embodiments herein may be implemented through one or more processors, such as a processor 802 in the third node 113 depicted in FIG. 8a, together with computer program code for performing the functions and actions of the embodiments herein. The processor 802 may be understood herein to be a hardware component. The program code mentioned above may also be provided as a computer program product, for instance in the form of a data carrier carrying computer program code for performing the embodiments herein when being loaded into the in the third node 113. It is however feasible with other data carriers such as a memory stick. The computer program code may furthermore be provided as pure program code on a server and downloaded to the third node 113.

The third node 113 may further comprise a memory 803 comprising one or more memory units. The memory 803 is arranged to be used to store obtained information, store data, configurations, schedulings, and applications etc. to perform the methods herein when being executed in the third node 113.

In some embodiments, the third node 113 may receive information from, e.g., the first node 111 and/or the second node 112, through a receiving port 804. In some examples, the receiving port 804 may be, for example, connected to one or more antennas in the third node 113. In other embodiments, the third node 113 may receive information from another structure in the communications network 100 through the receiving port 804. Since the receiving port 804 may be in communication with the processor 802, the receiving port 804 may then send the received information to the processor 802. The receiving port 804 may also be configured to receive other information.

The processor 802 in the third node 113 may be further configured to transmit or send information to e.g., the first node 111 and/or the second node 112, through a sending port 805, which may be in communication with the processor 802, and the memory 803.

The sending unit 801 may be the processor 802 of the third node 113, or an application running on such processor.

Those skilled in the art will also appreciate that the sending unit 801 described above may refer to a combination of analog and digital circuits, and/or one or more processors configured with software and/or firmware, e.g., stored in memory, that, when executed by the one or more processors such as the processor 802, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Thus, the methods according to the embodiments described herein for the third node 113 may be respectively implemented by means of a computer program 806 product, comprising instructions, i.e., software code portions, which, when executed on at least one processor 802, cause the at least one processor 802 to carry out the actions described herein, as performed by the third node 113. The computer program 806 product may be stored on a computer-readable storage medium 807. The computer-readable storage medium 807, having stored thereon the computer program 806, may comprise instructions which, when executed on at least one processor 802, cause the at least one processor 802 to carry out the actions described herein, as performed by the third node 113. In some embodiments, the computer-readable storage medium 807 may be a non-transitory computer-readable storage medium, such as memory stick, or stored in the cloud space. In other embodiments, the computer program 806 product may be stored on a carrier containing the computer program, wherein the carrier is one of an electronic signal, optical signal, radio signal, or the computer-readable storage medium 807, as described above.

The third node 113 may comprise an interface unit to facilitate communications between the third node 113 and other nodes or devices, e.g., the first node 111, and/or the second node 112. In some particular examples, the interface may, for example, include a transceiver configured to transmit and receive radio signals over an air interface in accordance with a suitable standard.

In other embodiments, the third node 113 may comprise the following arrangement depicted in FIG. 8b. The third node 113 may comprise a processing circuitry 802, e.g., one or more processors such as the processor 802, in the third node 113 and the memory 803. The third node 113 may also comprise a radio circuitry 808, which may comprise e.g., the receiving port 804 and the sending port 805. The processing circuitry 802 may be configured to, or operable to, perform the method actions according to FIG. 5, in a similar manner as that described in relation to FIG. 8a. The radio circuitry 808 may be configured to set up and maintain at least a wireless connection with, e.g., the first node 111, and/or the second node 112. Circuitry may be understood herein as a hardware component.

Hence, embodiments herein also relate to the third node 113 operative to operate in the communications network 100. The third node 113 may comprise the processing circuitry 802 and the memory 803, said memory 803 containing instructions executable by said processing circuitry 802, whereby the third node 113 is further operative to perform the actions described herein in relation to the third node 113, e.g., in FIG. 5.

When using the word "comprise" or "comprising", it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

REFERENCES

[1].—3GPP TS 23.501 v15.2.0 "System Architecture for 5G System"
[2].—3GPP TS 23.501 v15.2.0 "Procedures for 5G System"

The invention claimed is:

1. A method, performed by a first node, for managing data in a database in a communications network, the first node operating in the communications network, the method comprising:
 receiving a request from a second node operating in the communications network, the request being to modify an authorization to manage the data in the database, the request being received as a service operation of a set of service operations provided by a service of the database, and
 providing a response to the second node, the response being based on the received request, and being further based on the authorization as defined by a third node operating in the communications network, wherein the first node is a service producer of the database, the second node is a service consumer, and the third node is an initial provisioner of the authorization.

2. A method, performed by a second node, for managing data in a database in a communications network, the second node operating in the communications network, the method comprising:
 sending a request to a first node operating in the communications network, the request being to modify an authorization to manage the data in the database, the request being sent as a service operation of a set of service operations provided by a service of the database, and
 receiving a response from the first node, the response being based on the sent request, and being further based on the authorization as defined by a third node operating in the communications network, wherein the first node is a service producer of the database, the second node is a service consumer, and the third node is an initial provisioner of the authorization.

3. A method, performed by a third node, for managing data in a database in a communications network, the third node operating in the communications network, the method comprising:
 sending, to a first node operating in the communications network, an authorization for a second node operating in the communications network to manage the data in the database the authorization being sent as a service operation of a set of service operations provided by a service of the database, wherein the first node is a service producer of the database, the second node is a service consumer, and the third node is an initial provisioner of the authorization.

4. A first node configured to manage data in a database in a communications network, the first node being configured to operate in the communications network, the first node being further configured to:
  receive a request from a second node configured to operate in the communications network, the request being configured to modify an authorization to manage the data in the database, the request being configured to be received as a service operation of a set of service operations configured to be provided by a service of the database, and
  provide a response to the second node, the response being configured to be based on the request configured to be received, and being further configured to be based on the authorization as defined by a third node being configured to operate in the communications network, wherein the first node is configured to be a service producer of the database, the second node is configured to be a service consumer, and the third node is configured to be an initial provisioner of the authorization.

5. The first node according to claim 4, wherein the set of service operations comprises one or more service operations to manage the data of: Query, Create, Delete, Update, Subscribe, and Notify.

6. The first node according to claim 4, wherein each of the service operations is configured to use operation semantics comprising one of: a request and a response.

7. The first node according to claim 4, wherein the response configured to be provided is configured to be based on at least one of:
  a. an identity of the second node;
  b. a type of service operation configured to be requested to be performed by the second node;
  c. a granularity of the data in the database to be managed based on the authorization; and
  d. an identity of one or more: user equipments, subscribers or application the data is to be managed for.

8. The first node according to claim 7, wherein the granularity of the data is configured to be at a level of at least one of: data set, data subset, and one or more single attributes of the data.

9. The first node according to claim 8, wherein the data set comprises at least one of: Subscription Data, Policy Data, Structured Data for exposure, and Application Data.

10. The first node according to claim 4, wherein the authorization configured to be defined by the third node is an initial authorization, and wherein the first node is further configured to:
  receive, from the third node, the initial authorization for the second node to manage the data in the database, wherein the receiving of the initial authorization is configured to be performed as a first service operation of the set of service operations, and wherein the request from the second node is configured to be received as a second service operation.

11. The first node according to claim 4, wherein the database is a Unified Data Repository.

12. The first node according to claim 4, wherein the communications network is a Fifth Generation, 5G, network, and wherein the first node is configured to comprise a Unified Data Repository, UDR.

13. The first node according to claim 4, wherein the first node is configured to manage a Unified Data Repository, and wherein the service is configured to be a network function service.

14. The first node according to claim 4, wherein the request is configured to be received by the first node via a Nudr interface of the database.

15. A second node configured to manage data in a database in a communications network, the second node being configured to operate in the communications network, the second node being further configured to:
  send a request to a first node configured to operate in the communications network, the request being configured to be to modify an authorization to manage the data in the database, the request being configured to be sent as a service operation of a set of service operations configured to be provided by a service of the database, and
  receive a response from the first node, the response being configured to be based on the request configured to be sent, and being further configured to be based on the authorization as configured to be defined by a third node configured to operate in the communications network, wherein the first node is configured to be a service producer of the database, the second node is configured to be a service consumer, and the third node is configured to be an initial provisioner of the authorization.

16. The second node according to claim 15, wherein the set of service operations comprises one or more service operations to manage the data of: Query, Create, Delete, Update, Subscribe, and Notify.

17. The second node according to claim 15, wherein each of the service operations is configured to use operation semantics comprising one of: a request and a response.

18. The second node according to claim 15, wherein the response configured to be received is configured to be based on at least one of:
  a. an identity of the second node;
  b. a type of service operation configured to be requested to be performed by the second node;
  c. a granularity of the data in the database to be managed based on the authorization; and
  d. an identity of one or more: user equipments, subscribers or application the data is to be managed for.

19. The second node according to claim 18, wherein the granularity of the data is configured to be at a level of at least one of: data set, data subset, and one or more single attributes of the data.

20. The second node according to claim 19, wherein the data set comprises at least one of: Subscription Data, Policy Data, Structured Data for exposure, and Application Data.

21. The second node according to claim 15, wherein the database is a Unified Data Repository.

22. The second node according to claim 15, wherein the communications network is a Fifth Generation, 5G, network, and wherein the first node is configured to comprise a Unified Data Repository, UDR.

23. The second node according to claim 15, wherein the service is configured to be a network function service.

24. The second node according to claim 15, wherein the request is configured to be sent by the second node via a Nudr interface of the database.

25. A third node configured to manage data in a database in a communications network, the third node being configured to operate in the communications network, the third node being further configured to:

send, to a first node configured to operate in the communications network, an authorization for a second node configured to operate in the communications network to manage the data in the database, the authorization being configured to be sent as a service operation of a set of service operations configured to be provided by a service of the database, wherein the first node is configured to be a service producer of the database, the second node is configured to be a service consumer, and the third node is configured to be an initial provisioner of the authorization.

26. The third node according to claim 25, wherein the set of service operations comprises one or more service operations to manage the data of: Query, Create, Delete, Update, Subscribe, and Notify.

* * * * *